(No Model.)
E. C. CLAPP.
MICROMETER GAGE.
No. 582,154.        Patented May 4, 1897.
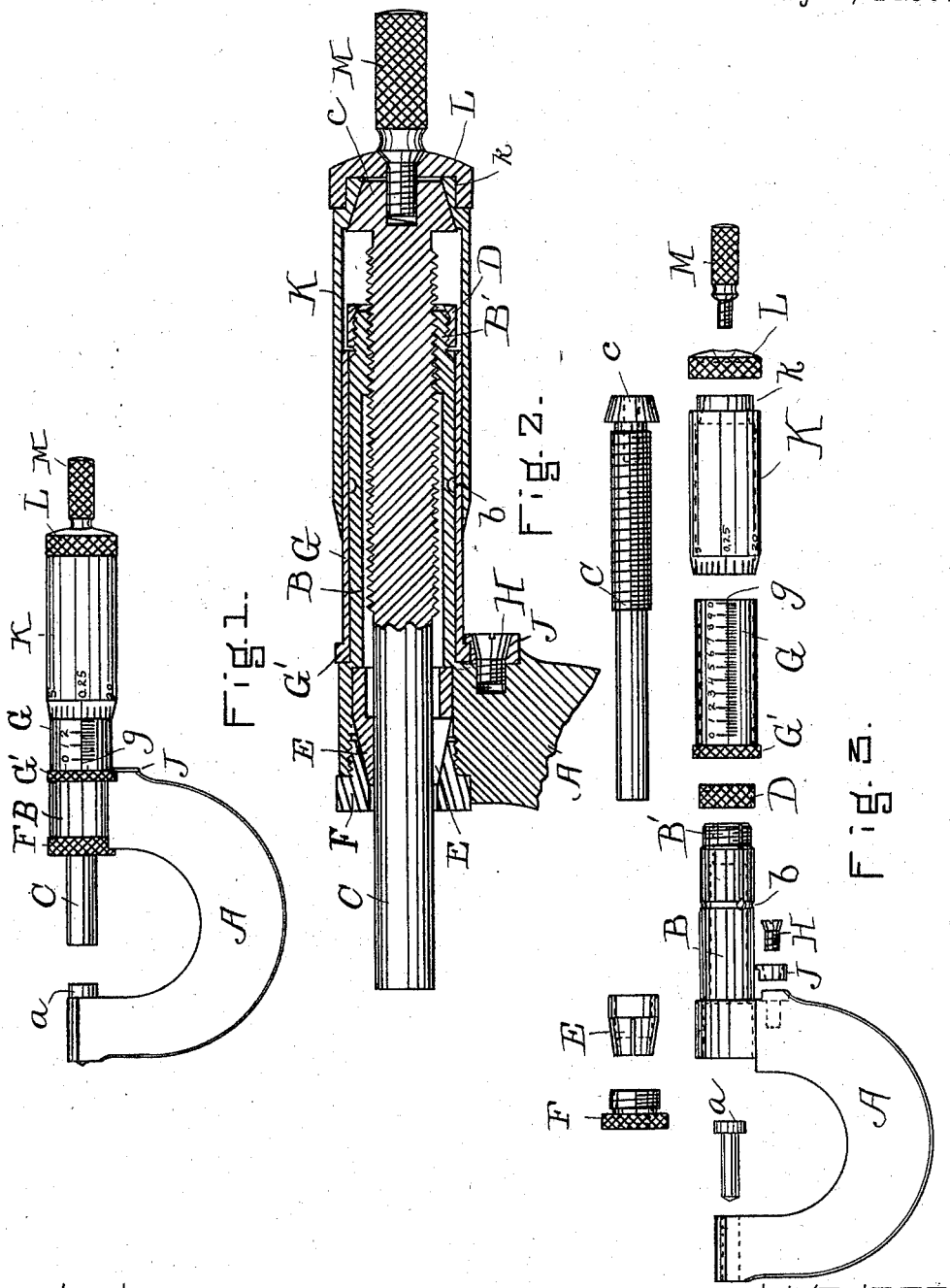
WITNESSES.
Matthew M. Blunt.
N. K. Baker
INVENTOR.
Edward Clifton Clapp,
by N. H. Jewett,
ATT'Y.

UNITED STATES PATENT OFFICE.

EDWARD CLIFTON CLAPP, OF ATHOL, MASSACHUSETTS, ASSIGNOR TO LAROY S. STARRETT, OF SAME PLACE.

MICROMETER-GAGE.

SPECIFICATION forming part of Letters Patent No. 582,154, dated May 4, 1897.

Application filed February 23, 1897. Serial No. 624,589. (No model.)

*To all whom it may concern:*

Be it known that I, EDWARD CLIFTON CLAPP, of Athol, in the county of Worcester and State of Massachusetts, have invented certain new and useful Improvements in Micrometer-Gages, of which the following, taken in connection with the accompanying drawings, is a specification.

This invention relates to that class of fine measuring instruments of which the micrometer-gage patents to Laroy S. Starrett, No. 433,311, dated July 29, 1890, and No. 448,089, dated March 10, 1891, are illustrations.

In such instruments part of the rotating spindle is threaded to engage internal threads of the cylindrical stem or body around which an external sleeve, beveled and graduated at its inner end, rotates with the spindle and moves forward and back with it. Heretofore it has been common to form on such stem or body a straight longitudinal base-line graduated in fortieths or other fractions of an inch corresponding to the threads of the spindle, and to subdivide and graduate the beveled end of the rotating sleeve in, say, twenty-five equal spaces, each of which being moved past the base-line indicates a longitudinal movement of the spindle one-thousandth part of an inch. It is difficult to so assemble the parts that when the spindle is closed against the anvil the zero-line of the rotary sleeve will coincide exactly with the base-line on the stem or body. Furthermore, the abutting ends of the spindle and anvil are liable to become worn, so that the original coincidence of said lines is lost, making the instrument inaccurate. This difficulty is overcome by one feature of my invention. Instead of forming the base-line and its graduations along the side of the stem or body I interpose between such body and the rotating external sleeve an intermediate sleeve, on which the graduated base-line is formed, and I make such intermediate or interposed sleeve adjustable originally by partial rotation and provide it with means for fixing its position when adjusted and for changing the adjustment when required. Such means consist, as herein shown, of a radial milled flange at one end of the intermediate sleeve, by which it may be partially rotated when required, and a screw entering the edge of the curved shank at its junction with the cylindrical body and carrying an annular collar, which engages with said flange to hold the sleeve in position. I do not, however, limit my invention to this particular means of adjusting and securing the intermediate sleeve.

My invention also includes an improved means of connecting the rotary sleeve and spindle to each other and to the milled end cap and rotating device.

In the drawings, Figure 1 is a side view of a micrometer-gage embodying my improvements. Fig. 2 is an enlarged longitudinal section through the parts surrounding the spindle. Fig. 3 represents the several parts detached and indicates their relation to each other, as hereinafter explained.

A represents the curved flat shank, forming part of the frame of the tool as heretofore.

B is the hollow and nearly cylindrical body, formed integral with the shank and internally threaded near its outer end to engage the threaded portion of the inclosed spindle C. The exterior and interior diameter of the body B is reduced, in successive steps, from the shank outwardly, as indicated in Figs. 2 and 3, in order to receive other parts, as will be explained. The anvil *a* is fixed permanently in the other end of the shank in line with the axis of the spindle C.

The outer end of the tubular body is of least diameter and is slotted longitudinally from an intermediate annular groove *b* to its extremity, as in Fig. 3, to form, say, three prongs B', which may be slightly drawn together to engage their internal screw-threads with the threads of the spindle C, so as to prevent any backlash and to compensate for wear. This drawing together of the body-prongs upon the threaded part of the spindle is effected by a thin milled ring D, screwed thereon and formed with an inwardly-extending beveled portion at its outer edge to bear on the beveled outer ends of said prongs when such ring is screwed up; but this feature I do not claim.

At the inner end of the body B its diameter is enlarged where it joins the curved shank A, and a connected series of spring-fingers E therein are compressed upon the unthreaded part of the spindle by screwing the internally-tapering and externally-threaded nut F into said body about as shown in said Patent No. 433,311.

Outside the reduced cylindrical portion of the body B, and fitting adjustably thereon, is the intermediate sleeve G, formed at one end with a radial milled flange G' to turn it by, and furnished with the longitudinal base-line $g$, graduated into fortieths or otherwise, to correspond to the number of threads to the inch on the spindle. Said radial flange fits snugly against the shoulder of the enlarged part of the body and is held firmly by a screw H, threaded into the edge of the shank A and furnished with a collar J, overlapping said flange. The sleeve G may therefore be adjusted by partial rotation to coincide, as to its base-line, with the zero-point on the outer sleeve, and when properly located may be fixed firmly by setting the screw H tightly, or it may fit so nicely as to be held by friction alone or by a short set-screw. The collar J is slightly concaved in one edge, so as to fit the convexity of the sleeve G. The screw-head may engage directly with said flange.

The external sleeve K surrounds this intermediate sleeve and, as heretofore, is beveled and peripherally graduated at its inner edge and at its outer end is secured firmly to the spindle C, so as to move with it and by the relative positions of the two lines of graduation to indicate the exact distance between the spindle and anvil. The novel manner of assembling the spindle, the sleeve K, and their rotating devices is shown in Figs. 2 and 3. The spindle C has an enlarged frusto-conical head $c$, which fits a like tapering opening in the outer end of sleeve K. Surrounding this opening is a cylindrical extension of the sleeve of reduced diameter, as at $k$, and into the angle thus formed the annular flange of the recessed end cap L fits, such cap being milled externally to assist in rotating the spindle by the thumb and finger. Through such cap and opening and axially into the spindle C, I insert a suitable fastening-screw M, which being tightened up secures the several parts in operative position.

The screw M, as shown, has an elongated milled stem materially less in diameter than the milled end cap L, and it serves to speed the rotation of the spindle and external sleeve, as is clearly specified in the two Starrett patents, Nos. 433,311 and 448,089, hereinbefore referred to. I therefore do not claim said speeding device, broadly, as of my invention, but simply, under this part thereof, the described combination and arrangement of parts.

I claim as my invention—

1. In a micrometer-gage, the rigid shank A and tubular body B projecting therefrom, and the internal spindle and external sleeve united for simultaneous movement; in combination with the intermediate sleeve G formed with the longitudinal base-line graduated as described, made adjustable by partial rotation around the body, and provided with suitable means for moving it and fixing its position, substantially as set forth.

2. In a micrometer-gage, the shank A, the tubular body projecting therefrom and internally threaded, the inclosed spindle engaging said threads and the external sleeve fixed to said spindle and peripherally graduated, in combination with the interposed longitudinally-graduated sleeve G, provided with the milled radial flange G' for adjusting it, and with a screw-fastening engaging therewith for fixing its position when adjusted, substantially as set forth.

3. In a micrometer-gage, the threaded body and the external rotating sleeve peripherally graduated at one end and having at its other end a cylindrical extension of reduced diameter with a tapering axial opening through it, in combination with the threaded spindle formed with a frusto-conical head fitting said opening, the milled end cap having an axial perforation and provided with an annular flange fitting over said cylindrical extension, and with a binding-screw extending through said perforation and opening, and threaded axially into the spindle, whereby said parts are firmly united, substantially as set forth.

In testimony whereof I have signed my name to this specification, in the presence of two subscribing witnesses, on this 5th day of February, A. D. 1897.

EDWARD CLIFTON CLAPP.

Witnesses:
ANDREW J. HAMILTON,
MINERVA R. PITTS.